United States Patent
Mayer et al.

(10) Patent No.: US 7,576,685 B2
(45) Date of Patent: Aug. 18, 2009

(54) RADAR SENSOR

(75) Inventors: Hermann Mayer, Vaihingen (DE); Bernhard Lucas, Besigheim (DE); Joerg Hilsebecher, Gerlingen (DE); Joachim Hauk, Renningen-Malmsheim (DE); Paco Haffmans, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 11/660,261

(22) PCT Filed: Jun. 24, 2005

(86) PCT No.: PCT/EP2005/052974

§ 371 (c)(1),
(2), (4) Date: Dec. 21, 2007

(87) PCT Pub. No.: WO2006/018344

PCT Pub. Date: Feb. 23, 2006

(65) Prior Publication Data

US 2008/0204308 A1    Aug. 28, 2008

(30) Foreign Application Priority Data

Aug. 17, 2004    (DE) .................. 10 2004 039 742

(51) Int. Cl.
*G01S 13/00*    (2006.01)
*G01S 7/40*    (2006.01)
(52) U.S. Cl. .................. 342/165; 342/70; 342/173; 342/174; 342/192
(58) Field of Classification Search ............. 342/70–73, 342/165–174, 192, 193, 195, 196
See application file for complete search history.

(56) References Cited

U.S. PATENT DOCUMENTS

| 5,392,047 | A | * | 2/1995 | Klausing | 342/25 F |
| 5,410,621 | A | * | 4/1995 | Hyatt | 382/260 |
| 5,479,440 | A | * | 12/1995 | Esfahani | 375/346 |
| 5,485,160 | A | * | 1/1996 | Suganuma | 342/195 |
| 5,929,802 | A | * | 7/1999 | Russell et al. | 342/70 |
| 5,935,068 | A | * | 8/1999 | Zhu et al. | 600/443 |
| 5,959,570 | A | * | 9/1999 | Russell | 342/70 |
| 6,107,956 | A | * | 8/2000 | Russell et al. | 342/70 |
| 7,046,857 | B2 | * | 5/2006 | McCarthy et al. | 382/254 |
| 7,391,362 | B2 | * | 6/2008 | Beckner | 342/179 |

FOREIGN PATENT DOCUMENTS

| DE | 42 40 225 | 6/1994 |
| WO | WO 99/27385 | 6/1999 |

* cited by examiner

*Primary Examiner*—Thomas H Tarcza
*Assistant Examiner*—Peter M Bythrow
(74) *Attorney, Agent, or Firm*—Kenyon & Kenyon LLP

(57) ABSTRACT

A radar sensor having a transceiver device (10, 12), an analog/digital converter (14) for converting the received signals (A) into digital data, a memory device (18) for storing the digital data as a useful data set (D1) which provides the digital data for a recording period as a function of time, a transformation device (16) for calculating a spectrum (S) of the useful data set, and an analyzer (24) for analyzing the spectrum, characterized by a back-transformation device (22) for transforming the spectrum (S) back into a digital comparison data set (D2) and a comparator (20) which is designed for the purpose of evaluating the match between the useful data set (D1) and the comparison data set (D2) and, in the event of a match, conveys the spectrum (S) to the analyzer (24) and in the event of a non-match triggers error handling.

6 Claims, 1 Drawing Sheet

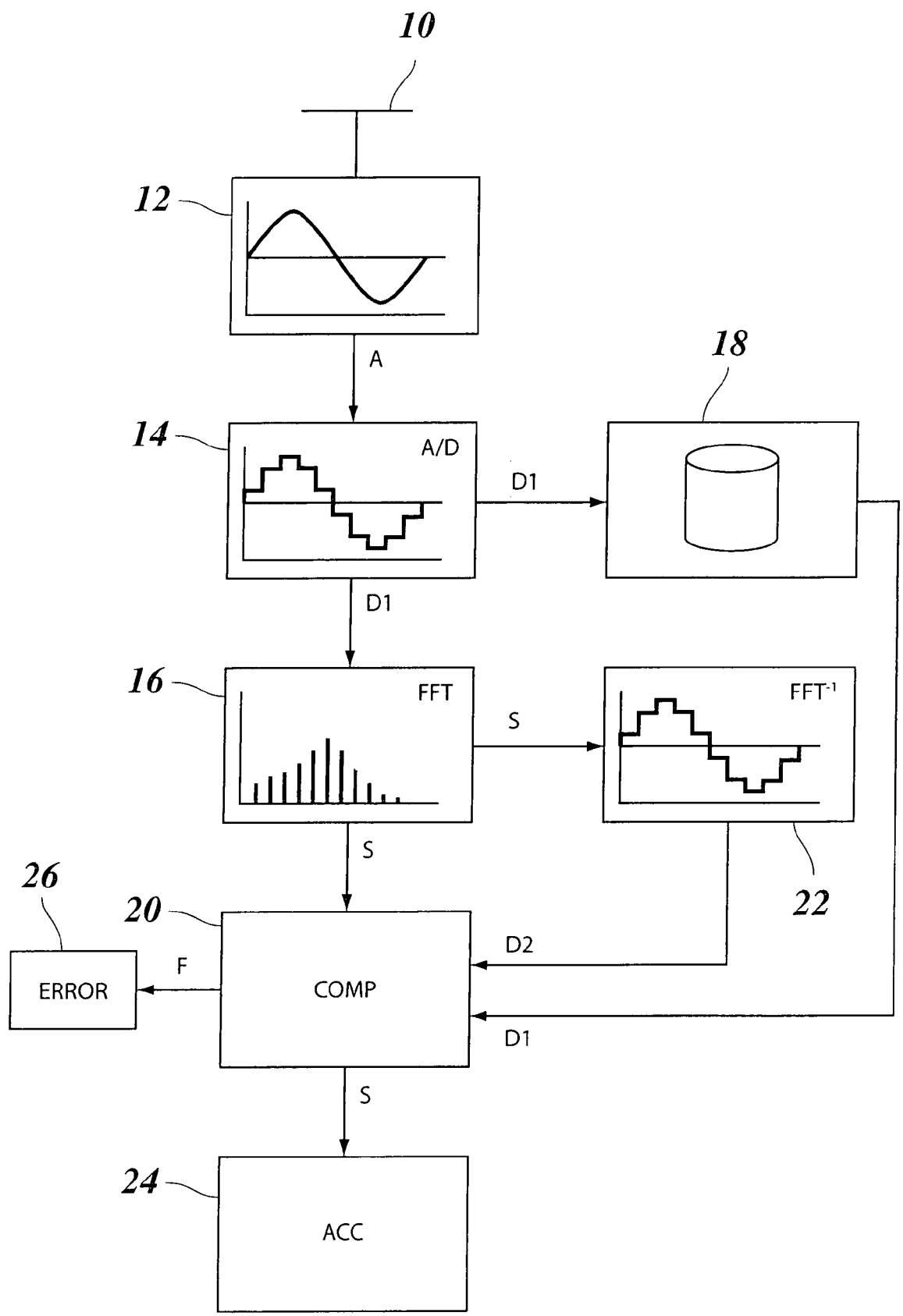

RADAR SENSOR

BACKGROUND INFORMATION

The present invention relates to a radar sensor having a transceiver device, an analog/digital converter for converting the received signals into digital data, a memory device for storing the digital data as a useful data set which provides the digital data for one recording period as a function of time, a transformation device for calculating one spectrum of the useful data set, and an analyzer for analyzing the spectrum.

In particular, the present invention deals with a radar sensor which forms a component of a driver assist system in a motor vehicle, e.g., an ACC system (adaptive cruise control) for an automatic radar-supported distance regulation.

A typical example for a radar sensor of the above-mentioned type is an FMCW radar (frequency modulated continuous wave) in which the frequency of the transmitted radar signal is periodically modulated at a certain ramp gradient. The frequency of a signal which was reflected from a radar target and is subsequently received by the radar antenna at a certain point in time thus differs from the frequency of the signal transmitted at this point in time by an amount which is a function of the signal propagation delay and thus of the distance to the radar target, and also of the Doppler shift and thus of the relative velocity of the radar target. The received signal is mixed with the signal transmitted at this point in time in a mixer in the radar sensor, so that a low-frequency signal whose frequency corresponds to the frequency difference between the transmitted signal and the received signal is obtained by pulsation. This low-frequency signal is then digitized in the analog/digital converter using a suitable time resolution. The digitized data is recorded over a certain recording period which, for example, corresponds to the length of the ramp with which the transmitted signal is modulated. Via an algorithm, which is known as "fast Fourier transformation" (FFT), a spectrum is formed from the data set obtained in this way. In this spectrum, each detected radar target is represented by a peak which rises more or less clearly above the noise level. By repeating this procedure using different ramp gradients it is possible to eliminate the ambiguity between the propagation time-dependent frequency shift and the Doppler shift so that the distance to and the relative velocity of the radar target may be calculated.

An angle-resolving radar sensor which generates multiple radar lobes slightly offset toward one another is mostly used in motor vehicles, and the above-described signal processing and signal analysis take place separately for each radar lobe, preferably in parallel channels.

In order to be able to follow the located radar targets with high time resolution, digital data processing should take place at a bit rate as high as possible. However, the occasional occurrence of errors may not be completely ruled out. Such errors may not only occur due to the fact that the received signal is noisy, but also due to the fact that electromagnetic interference signals interfere with the analyzing electronics or that individual data bits are corrupted during data transmission and data processing (bit aliasing). Further error sources are software errors or hardware errors which are detectable only sporadically under unfavorable circumstances and have therefore been overlooked during quality control.

For reasons of traffic safety, the radar sensor should make it possible to locate other vehicles and obstacles as reliably as possible. Moreover, efforts are made to upgrade the functionality of driver assist systems to the point of completely autonomous vehicle control as a long-term objective. To the extent to which new and increasingly complex tasks are assigned to the driver assist system, demands on the reliability of the radar sensor also increase.

ADVANTAGES OF THE INVENTION

The present invention having the features cited in claim 1 provides a radar sensor with improved reliability.

According to the present invention, this is achieved by the fact that in addition to the transformation device, using which the spectrum is calculated via fast Fourier transformation for example, a back-transformation device is provided which transforms the calculated spectrum into a time-dependent function. If both the transformation and the back-transformation run error-free, the digital data set obtained by the back-transformation, here referred to as a comparison data set, should be identical with the original useful data set from which the spectrum has been calculated. According to the present invention, the useful data set is therefore compared with the comparison data set in a comparator, and only when both data sets match sufficiently closely is the spectrum calculated by the transformation device conveyed to the analyzer as the valid spectrum. Otherwise, the presence of an error is inferred and an appropriate error handling routine is initiated.

A sort of self-testing function is implemented in the radar sensor according to the present invention, using which the entire processing chain between the analog/digital converter and the analyzer may be monitored for error-free operation. This makes it possible during operation of the radar sensor to immediately detect errors occurring in this processing chain and suitable countermeasures may be initiated to avoid a malfunction of the driver assist system.

Advantageous embodiments of the present invention are cited in the subclaims.

A digital data processing device, e.g., a microcomputer, is typically provided for processing the data supplied by the analog/digital converter in which the transformation device is implemented in the form of a software module, as the algorithm for the fast Fourier transformation, for example. The back-transformation may also be implemented as a software module which runs on the same hardware as the original Fourier transformation. However, hardware which is independent from the hardware for the transformation device is preferably used for the back-transformation. For example, a digital processor (DSP) may be used as the transformation device for the fast Fourier transformation while another processor, e.g., a microcontroller, is used for the back-transformation which is able to additionally execute other functions within the radar sensor, e.g., control functions. Due to the achieved independence of the hardware, it is ensured that hardware errors in the transformation device may also reliably be detected.

The back-transformation, e.g., an inverse Fourier transformation, is mathematically closely related to the original Fourier transformation because for the effect of a Fourier transformation operator F on a time-dependent function f (t) the following equation applies:

$F(F(f(t)))=k \cdot f(-t)$, with a suitable normalization factor k.

Therefore, it is possible in principle to use the same algorithm for the back-transformation as the one used for the original Fourier transformation. However, a special algorithm, which is independent from the algorithm used for the original Fourier transformation, is preferably used for the back-transformation. This ensures that software errors may also be detected.

Error handling, which is initiated in the event of a discrepancy between the comparison data set and the useful data set, means in the simplest case that the respective spectrum is discarded. Since the radar detection is periodically repeated in short time intervals, e.g., in intervals of 1 ms, the elimination of the result from a single measuring cycle may, as a rule, be tolerated as long as it ensured that the erroneous result is not being used for following the radar targets.

However, in a preferred embodiment, the comparator is designed in such a way that it counts the events in which the spectrum is discarded as invalid. If such events accumulate, e.g., within a predefined time interval with a frequency which is above a certain threshold value, it points to a system error and error handling then means that an error message is output to the driver and/or a reset and restart of the system is executed, or, if a restart is also unsuccessful, the system is shut down entirely.

DRAWING

An exemplary embodiment of the present invention is illustrated in the drawing and explained in greater detail in the following description.

The sole FIGURE in the drawing shows a block diagram of a radar sensor according to the present invention.

DESCRIPTION OF THE EXEMPLARY EMBODIMENT

The radar sensor represented in the drawing as a block diagram has an antenna 10 as the transceiver device including an associated mixer 12 which supplies a low-frequency analog signal A as the measuring signal. Analog signal A is digitized in an analog/digital converter 14. The digital data obtained in this way is recorded within each measuring cycle of the radar sensor over a predefined recording time span so that a digital useful data set D1 is obtained which reflects the time curve of the measuring signal during the recording time span.

Useful data set D1 is subjected to a fast Fourier transformation in a transformation device 16. At the same time, useful data set D1 is buffered in a memory device 18.

Transformation device 16 is formed, for example, by a digital signal processor in which an algorithm for the fast Fourier transformation is implemented. The result of the Fourier transformation is a spectrum S which is conveyed to a comparator 20.

Transformation device 16 also outputs spectrum S to a back-transformation device 22 which is formed by a separate processor, e.g., a microcontroller of the radar sensor. An algorithm for an inverse Fourier transformation is implemented in this microcontroller and this algorithm is independent from the algorithm used in transformation device 16.

The result of the back-transformation is a digital comparison data set D2 which indicates the time curve of the measuring signal during the recording time span and which should be identical to useful data set D1 if all transformations have been carried out correctly. Comparator 20 compares comparison data set D2 with useful data set D1 which has been buffered in memory device 18. When both data sets match, comparator 20 conveys spectrum S as a valid spectrum to analyzer 24, e.g., to an ACC controller for the automatic distance regulation in a motor vehicle.

Since the results of the transformations in transformation device 16 and in back-transformation device 22 each represent only approximations to the mathematically correct result, in practice, even when all calculations have been carried out correctly, useful data set D1 and comparison data set D2 are not completely identical. As a criterion for sufficient correspondence between these data sets it may be checked in comparator 20, for example, whether the sum of the quadratic deviations between the two data sets is below a certain threshold value and whether the deviations for each point in time are within a certain bandwidth.

If, according to this criterion, sufficient correspondence does not exist between useful data set D1 and comparison data set D2, spectrum S is not conveyed to analyzer 24 but rather discarded and an error signal F is simultaneously output to an error handling device 26.

Error handling device 26 continuously calculates a sliding mean value for the error frequency and, when the error frequency is above a certain threshold value, it triggers a reset and restart of the entire analyzing electronics of the radar sensor. It is possible to simultaneously output a warning signal to the driver which alerts him to the fact that the ACC system is not available at this time. If the restart or repeated restart attempts are not successful, error handling device 26 triggers a complete shutdown of the ACC system and the driver receives a prompt on a display to visit a repair shop.

The functions of comparator 20 and error handling device 26 may be carried out by the microcontroller, for example, which also carries out the function of back-transformation device 22.

What is claimed is:

1. A radar sensor comprising:
a transceiver device;
an analog/digital converter for converting received signals into digital data;
a memory device for storing the digital data as a useful data set which provides the digital data for a recording period as a function of time;
a transformation device for calculating a spectrum of the useful data set;
an analyzer for analyzing the spectrum;
a back-transformation device for transforming the spectrum back into a digital comparison data set; and
a comparator for evaluating a match between the useful data set and the comparison data set and, in the event of a match, for conveying the spectrum to the analyzer and, in the event of a non-match, for triggering error handling.

2. The radar sensor according to claim 1, wherein the transformation device and the back-transformation device are formed by separate hardware components.

3. The radar sensor according to claim 1, wherein transformation algorithms, independent from one another, are implemented in the transformation device and the back-transformation device.

4. The radar sensor according to claim 1, wherein the comparator discards the spectrum in the event of a non-match of the useful data set with the comparison data set.

5. The radar sensor according to claim 1, wherein the comparator outputs an error signal to an error handling device in the event of a non-match of the useful data set with the comparison data set.

6. The radar sensor according to claim 5, wherein the error handling device is for at least one of (a) shutting down the radar sensor, (b) restarting the radar sensor and (c) outputting a warning message when an error frequency is above a preselected threshold value.

* * * * *